(12) United States Patent
Jenrette (10) Patent No.: US 6,941,237 B2
(45) Date of Patent: Sep. 6, 2005

(54) SIGNAL DETECTION

(75) Inventor: William Jenrette, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 10/662,600

(22) Filed: Sep. 15, 2003

(65) Prior Publication Data

US 2005/0060113 A1 Mar. 17, 2005

(51) Int. Cl.$^7$ .......................... G01R 23/16; F01R 23/14
(52) U.S. Cl. .......................... 702/77; 702/60; 324/76.41
(58) Field of Search .............................. 702/77, 60, 61, 702/75, 76; 324/76.39, 76.41, 76.42; 341/143, 118

(56) References Cited

U.S. PATENT DOCUMENTS 5,627,759 A   5/1997   Bearden et al.

6,094,449 A * 7/2000 Komatsu .................... 375/136

* cited by examiner

Primary Examiner—John Barlow
Assistant Examiner—Meagan S Walling
(74) Attorney, Agent, or Firm—Buckley, Maschoff & Talwalkar LLC (57) ABSTRACT

A method, apparatus, and system for detecting a signal of interest. According to some embodiments, a power of a frequency component of a signal is determined. The power is accumulated for the long and short term, and a delta integrated power spectrum (e.g., a difference between the accumulated power for the long-term and the accumulated power for the short-term) is found. A high delta integrated power spectrum and a normalized delta integrated power spectrum may also be found. It may then be determined whether the high delta integrated power spectrum represents a signal of interest by comparing the power of the high delta integrated power spectrum to the power of the normalized delta integrated power spectrum.

28 Claims, 4 Drawing Sheets

SIGNAL DETECTION

BACKGROUND

Public Switched Telephone Network (PSTN) alerting signals, including Call-Waiting and Caller-ID alerting signals, are communicated using numerous standards throughout the world. Typically, modems are manually configured through a homologation process so that they will operate utilizing a desired standard. Most countries, and even portions of countries, use different standards, however, such that there may be hundreds of standards being utilized throughout the world at any given time. Thus, manual configuration may be time consuming. Furthermore, such manual configuration is generally difficult, such that configurations defined for certain standards may not work reliably.

BRIEF DESCRIPTION OF THE DRAWINGS

The accompanying drawings, wherein like reference numerals are employed to designate like components, are included to provide a further understanding of signal detection, are incorporated in and constitute a part of this specification, and illustrate embodiments of signal detection that together with the description serve to explain the principles of signal detection.

In the drawings.

DETAILED DESCRIPTION

Systems, apparatuses, and methods for automatically detecting signals, including PSTN alerting signals, are provided. Those signals may be audio frequency signals and those audio signals may be sampled at a sampling rate which may be in the range, for example, of 7200 to 10286 Hz. Those signals may include information unrelated to the signals detected by the systems, apparatuses and methods described herein. Information may comprise any data capable of being represented as a signal, such as an electrical signal, optical signal, acoustical signal and so forth. Examples of information in this context may include analog or digital voice communications, images, video, text, data and so forth.

As is known to those skilled in the area of frequency sampling, and as stated by the Nyquist Theorem, an important consideration for sampling is that the sampling rate must be at least twice the highest analog frequency component of a portion of a signal being sampled that is desired to be measured. The Nyquist Theorem suggests that for a digital representation of an analog signal, such as an audio signal, to accurately represent the analog signal, the sampling rate must be at least twice the highest analog frequency component of interest in that signal.

The number of samples to be taken into consideration for a power spectrum tap may include at least one complete wave (360 degrees) of the signal being sampled. In such a situation where at least one wave, such as a sine wave that is regularly repeating on the signal, is desired in a power spectrum tap, enough samples of the signal will be taken to assure that those samples cover a range of the signal that should include at least one complete wave of the signal. For example, four samples may describe a complete sine wave in a particular signal where the sampling rate is twice the highest frequency component of the signal.

A number of samples to be taken may, for example, be calculated by dividing a chosen sampling rate, which may be measured in samples per second, by the lowest frequency of interest, generally measured in Hertz (Hz). Thus, for example, if the sampling rate chosen is 2400 samples per second and the lowest frequency of interest is 100 Hz, then the number of samples that could be taken at one time for Fourier analysis might be 2400/100, or 24 samples.

Additional samples may be included to improve accuracy of the power spectrum measured. A maximum number of taps to be included in a power spectrum may be limited by an amount of memory or processor time available for processing the power spectrum taps. A number of samples may thus be selected practically to provide enough accuracy to identify a standard from amongst multiple standards on which the signal is being carried.

Initially, a power spectrum may be generated from the appropriate number of samples of an analog stream representing or carrying the signal to be examined. Then a difference between an average frequency of that power spectrum and a peak frequency for a portion of that power spectrum may be determined. A Fourier transform may, for example, be utilized to process audio sample blocks of the signal as is known in the signal processing technologies. The sampling system may sample those blocks of the audio carrying signal at discrete intervals. The Fourier transform may then convert the sampled signal to a function of frequency. That frequency, in turn, may reveal the signal, which may be carried on a single frequency or may be carried over a set of frequencies known as a "carrier set." The multiple signals carried may in turn be referred to as "multi-tone."

A carrier set is one or more frequencies capable of being modified to carry information by, for example, amplitude modulation, frequency modulation, or phase modulation. Amplitude is the signal strength, or signal power, and is the relative "height" of the wave. Frequency is the rate at which an electromagnetic waveform alternates as is usually measured in Hertz (cycles per second) and equals the number of complete cycles occurring in one second. Phase is the relationship between a signal and its horizontal axis, also called the zero access point. A full signal cycle describes a 360° arc. Embodiments of standard detection could be used in frequency modulation and other modulation based techniques.

The carrier set in DSL, for example, allows 1 bit stream to be carried on a multi-tone signal. Carrier set A43, for example, specifies three downstream frequencies of 40 times 4.3125 kHz, 56 times 4.3125 kHz, and 64 times 4.3125 kHz creating a multi-tone signal. Those tones combine to send a signal. Information, typically in the form of bits of data, are transmitted by changing some feature of the signal (e.g., frequency, amplitude or phase of the signal), transmitting the signals by modulation from the transmitting node, and then changing the signal back by demodulation upon reception at the receiving node. Of course, similar carrier systems allow for multiple information channels to be carried by many other broadband systems as well.

A43, B43, and C43 carrier sets are used principally with Asymmetric Digital Subscriber Lines (ADSL) in different parts of the world, with A43 used primarily in North America, B43 used primarily in Europe, and C43 used primarily in Japan. An A4 carrier set is a member of the 4 kHz signaling family that uses a single upstream carrier frequency and single downstream carrier frequency. The A4 carrier set is used primarily with Symmetric Digital Subscriber Line (DSL) modem types.

To generate the power spectrum, magnitude and phase of a sample of the signal, corresponding to the desired power spectrum, may be calculated. The magnitude of the power spectrum may be calculated, for example, by performing a real portion of a Discrete Fourier Transform (DFT) or a Fast Fourier Transform (FFT), and the phase of the power spectrum may be calculated by performing an imaginary portion of the DFT or FFT.

The device performing the Fourier transform may be any device programmed or created to perform the Fourier transform. For example, the device may be a processor such as a digital signal processor (DSP). The DSP or another device may seek a detector threshold that is greater than a frequency at which no audio component is present on the signal and less than a frequency at which one or more audio components are indicated on the signal. By using the detector threshold, a signal level indicating that the desired component is present on the signal may be distinguished and detected. Thus, utilizing that detector threshold, the DSP may determine whether a frequency on the sampled signal is greater than the threshold, indicating that at least one audio component is present on the signal.

A frequency component of the power spectrum, having one or more amplitudes, may then be created by applying the Pythagorean Theorem to the magnitude and phase of the sample. In doing so, the two portions of the Fourier Transform are squared, added together, and then the square root of that sum is taken. The result may be viewed as one frequency component of the power spectrum of the signal.

A power spectrum may be viewed as a signal relative to frequency transformed from a signal relative to time. In other words, the power spectrum separates the signal into various frequency components that each include a range of frequencies. Each range of frequencies may furthermore have one or more amplitudes associated therewith, those amplitudes corresponding to power in that frequency range. A tap may then be the amount of power that the signal contains within a frequency range corresponding to one of those frequency components.

Multiple most recent power taps may be taken and integrated over time by, for example, an infinite impulse response (IIR) filter or other digital signal filter to create a long-term integrated power spectrum. An IIR filter generally outputs a weighted sum of its inputs with greatest weight placed on most recent input samples and lesser weight placed on older samples. For example, a long-term integrated power spectrum may be calculated utilizing a set of IIR filters, one per tap, each one with a time constant of 400 milliseconds (mS), a time period that may be suitable to represent a long-term integrated power spectrum.

The term "time constant" may be defined as the time required for the amplitude of a signal to rise or fall exponentially by approximately 63% of its peak or trough. A time constant of 400 mS thus may roughly indicate that the effect of a particular sample is reduced by approximately 37% of its original value after 400 mS. It generally takes about 2.3 time constants for the effect of a particular sample to drop to 10% of its original value. Thus, a higher time constant will result in a slower response to changing input values and a lower time constant will result in a faster response.

The most recent power taps may similarly be integrated over time to generate a short-term integrated power spectrum. For example, a short-term integrated power spectrum with a time constant of 200 mS may be appropriate.

The long-term integrated power spectrum may then be subtracted from the short-term integrated power spectrum to generate a delta integrated power spectrum. Thus the delta integrated power spectrum may represent a short-term deviation from a long-term power level experienced for the sensed frequency range.

A plurality of delta integrated power spectrum values may be calculated and added together in, for example, an accumulator device or a variable. Once the delta integrated power spectrum has been accumulated for a desired period of time, a complete delta power spectrum has been generated. The complete delta power spectrum may then be divided by the number of delta integrated power spectrum values include therein to find an average power in the complete delta power spectrum. The number of delta integrated power spectrum values that are accumulated in the complete delta power spectrum may vary as desired. Accumulation of 48 delta integrated power spectrum values has been found to be sufficient, while more delta integrated power spectrum values may be accumulated to increase accuracy and fewer delta integrated power spectrum values may be accumulated to reduce processing and overhead.

A plurality of individual delta integrated power spectrum values may furthermore be retained. For example, six delta integrated power spectrum values may be retained in a priority queue. The value of each new delta integrated power spectrum may be compared to the values in the priority queue and a new delta integrated power spectrum value may replace the lowest value in the priority queue if the new delta integrated power spectrum value is greater than that lowest value.

A standard utilized for the signal may then be determined from the measurements taken once one or more complete delta power spectrums has been generated. To determine the standard, the average of the delta integrated power spectrums in a complete power spectrum may be calculated. Simultaneously, if desired, the most powerful delta integrated power spectrum values for the completed delta power spectrum may be moved from the priority queue to another memory location so that delta integrated power spectrum values from another delta integrated power spectrum may be stored in the priority queue. Thus, a new complete delta power spectrum may be created while calculations for a past complete delta power spectrum are simultaneously computed. Those most powerful delta integrated power spectrum values moved from the priority queue may then be sorted by frequency.

Delta integrated power spectrum values that were taken at adjacent times may then be combined. Adjacent delta integrated power spectrum values may be combined by adding their powers and frequency ranges and replacing the two adjacent delta integrated power spectrum values with a single combined delta integrated power spectrum value. Combination of adjacent delta integrated power spectrum values may be performed because when using a DFT, if an input frequency is the frequency of a particular delta integrated power spectrum, the full power of the delta integrated power spectrum will be recorded as desired. If, however, the tone or other portion of the signal to be detected falls between two delta integrated power spectrums, then its power will be will be recorded as being distributed between those two delta integrated power spectrums. Thus, by combining the neighboring delta integrated power spectrums, accurate power and frequency values may be obtained for the tone or other desired portion of the signal.

A significantly powerful delta integrated power spectrum is likely to indicate presence of a tone, while an insignificantly powerful delta integrated power spectrum is likely to indicate that no tone is present. Significance may be determined by subtracting the average delta integrated power spectrum value, calculated as described above, from the power of the most powerful delta integrated power spectrum. The resulting differential may then be compared to a high significance threshold, which may be determined empirically so that tones are generally represented by powers above the high significance threshold. Thus, the most powerful delta integrated power spectrum value may be chosen and compared to the high significance threshold to determine whether that delta integrated power spectrum value is significantly powerful, thereby indicating the presence of a tone or other portion of the signal that is to be identified.

A time over which the most powerful tap is significant may then be determined. That significant time may begin when the power becomes greater than the high significance threshold. That time may furthermore end when the power becomes less than a low significance threshold. That time may further indicate whether a tone was present when the delta integrated power spectrum was taken, with a greater amount of time indicating presence of the tone and a lesser amount of time indicating no tone.

The use of a high and a low significance threshold may beneficially provide hysteresis, which may avoid falsely detecting a start point of a tone by avoiding signal anomalies caused by something other than a tone that are higher than the low significance threshold, while continuing to register tone signals until the low significance threshold is reached.

Thus, a minimum duration or time threshold, over which a tone should be significant, may be compared to the time over which a tap is found to be significant to further assure that the tap is experiencing a tone. That minimum time threshold may also be a predetermined amount of time and may be determined empirically. The minimum threshold time may be set, for example, to half the length of time of the worlds shortest PSTN alerting signal where an alerting signal is desired to be sensed.

If the most powerful delta integrated power spectrum passes each of those tests: amount of power present and length of time present, it is assumed to be significant. Once significance has been assumed, values of a number of most powerful delta integrated power spectrums from the complete power spectrum may be used, possibly along with the sampling frequency, to determine which of a plurality of standards is being utilized to carry the signal.

That information may further be reported to a host computer for determination of the applicable standard. A number of most powerful delta integrated power spectrum values to be reported that has been used successfully is the three most powerful delta integrated power spectrum values. The report may contain an amount of time that the signal was significant during the complete power spectrum, the frequency of the significant signal sensed at the most powerful delta integrated power spectrums, a range of frequencies experienced during the most powerful delta integrated power spectrums, and the power of the most significant delta integrated power spectrums. Moreover, if no delta integrated power spectrum is found to be significant during a complete power spectrum that may also be reported to indicate that information relating to the carrier standard has not yet been sampled.

The information reported may then be compared to a variety of standards and matched to the most closely conforming standard, which may be assumed to be the standard utilized with the signal.

Figure 1:
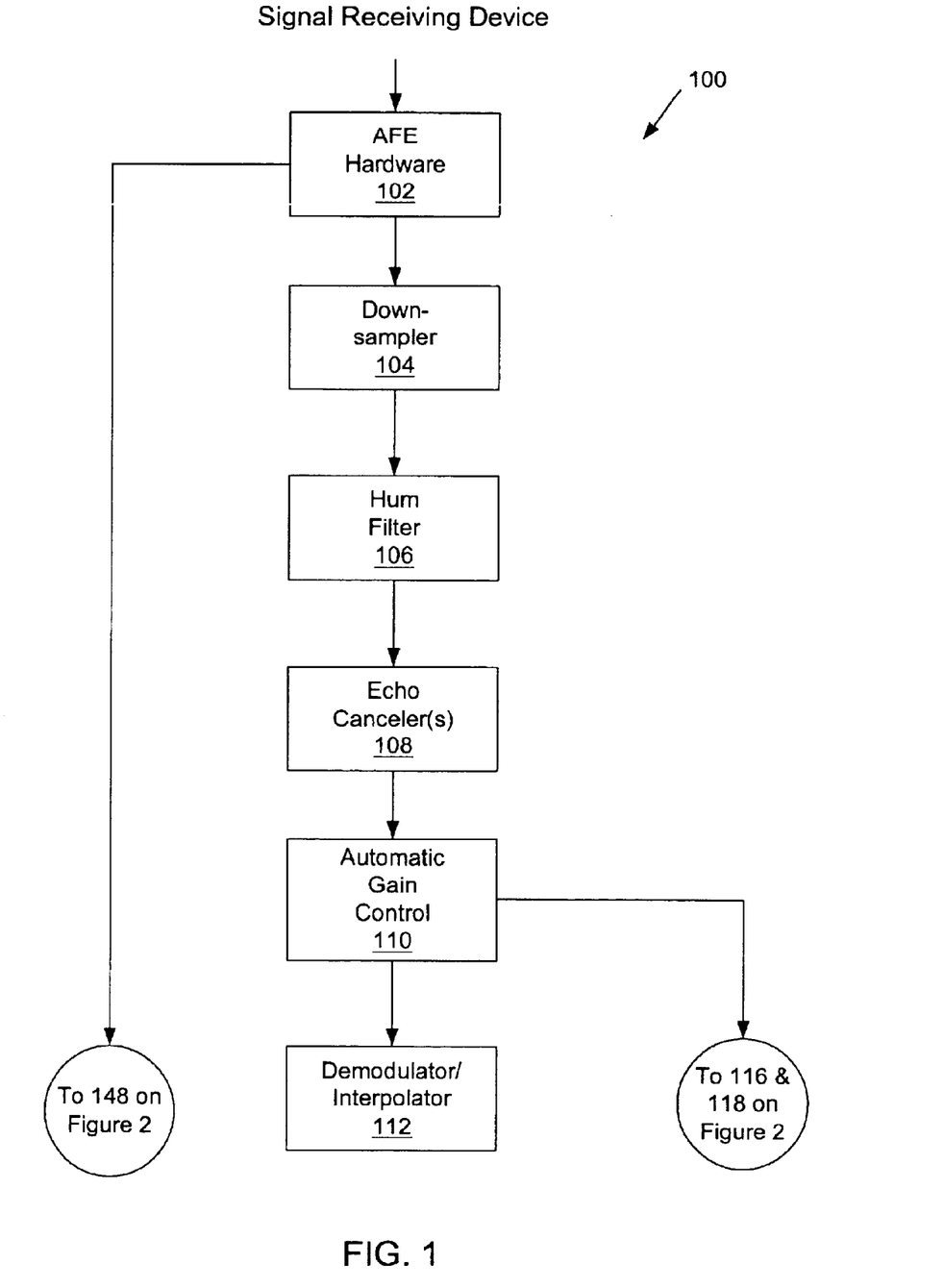
FIG. 1 illustrates an embodiment of a signal receiving device.

FIG. 1 illustrates an embodiment of a signal receiving device 100. The signals received at the signal receiving device 100 may include PSTN alerting signals, which may be used to determine a standard by which the signal is being transmitted.

An analog front end clock ("AFE clock") 102 may be coupled to a signal at an input of the AFE clock 102 to transmit or receive data synchronously across an analog medium. A down-sampler 104 may have an input that is coupled to an output of the AFE clock 102 to sample a signal received from the AFE clock 102.

The down-sampler 104 generally creates a miniaturized duplicate of the original signal, generally so that it can be processed or stored more efficiently. Down-sampling allows the reduced signal to be used as a proxy, while preserving the information content of the original signal. A down-sampler 104 may, for example, decimate the proxy by retaining only every other sample of the original signal. A down-sampler 104 may also act as a low-pass digital filter and may attenuate higher frequency signals more than lower frequency filters. Such down-sampling may, however, cause the loss of some needed information contained in the original signal. Thus, depending on the particular design requirements, a down-sampler 104 may combine decimation and a corrective filter to compensate for the error that decimation alone would introduce. Using down-sampling, each output sample may be a function of two or more input samples.

A hum filter 106 may be used to remove hum from the signal and an echo canceller 108 may be used to remove echo from the signal. A gain control 110 may be used to amplify the signal. The signal may then be transmitted from the gain control to a demodulator or interpolator 112 and also to a signal detector such as the signal detector 114 illustrated in FIG. 2. The sampling rate of the signal receiving device 100 may also be transmitted to the signal detector.

Figure 2:
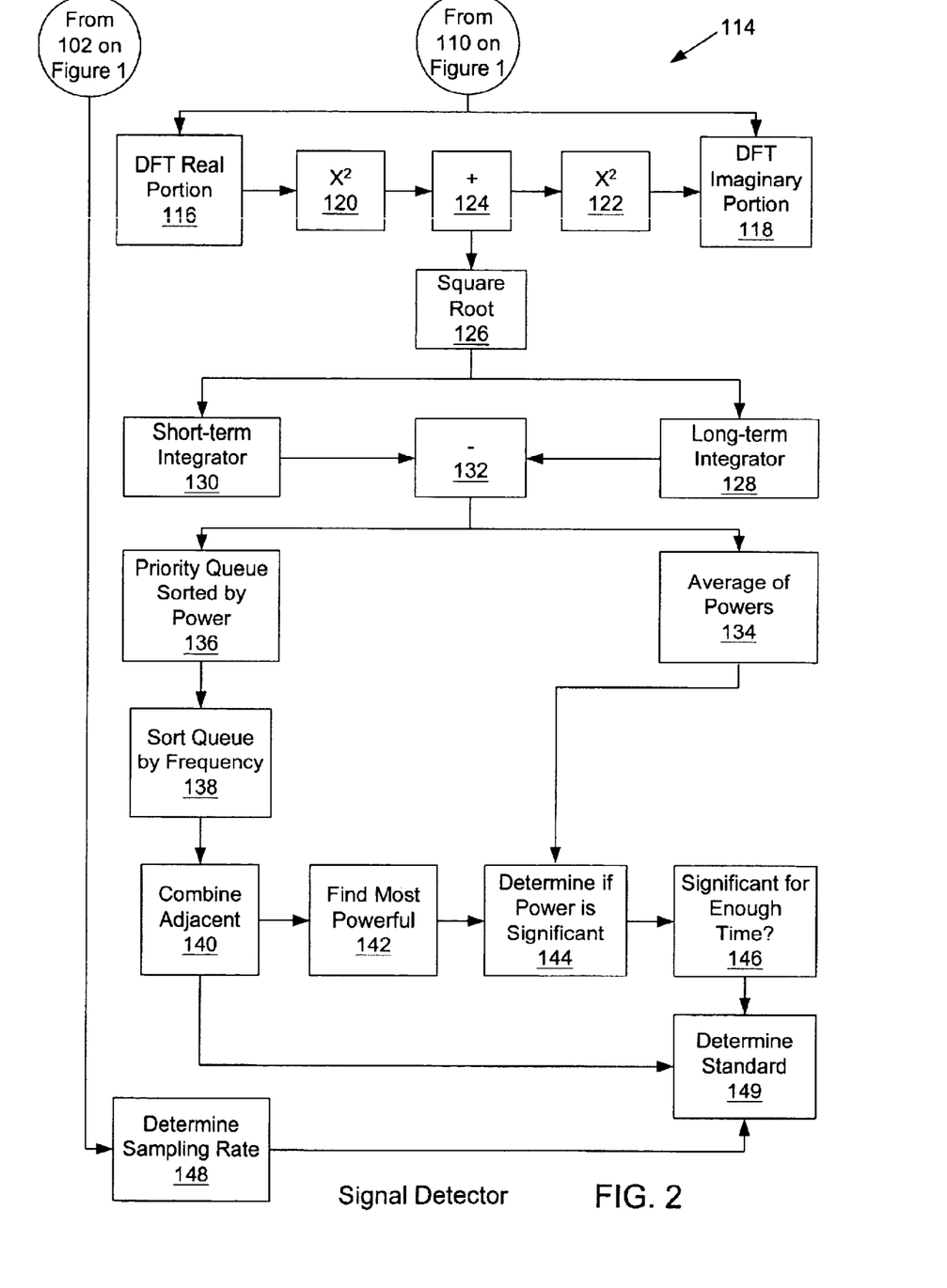
FIG. 2 illustrates an embodiment of a method of detecting a signal.

FIG. 2 illustrates a signal detector 114. The signal detector 114 may perform a discrete Fourier transform on the real portion of the signal at 116 and perform a discrete Fourier transform on the imaginary portion of the signal at 118. The magnitude of the signal resulting from the performing the discrete Fourier transform on the real portion of the signal is squared at 120 and the phase of the signal resulting from the performing the discrete Fourier transform on the imaginary portion of the signal is squared at 122. The squared magnitude of 120 and the squared phase of 122 are then added at 124 and the square root of that sum is taken at 126 to provide one frequency component of the power spectrum of the signal. That frequency component may include an amplitude having an amount of power referred to as a tap.

The frequency components are accumulated by an IIR over a long-term at 128, resulting in a long-term integrated power spectrum and are accumulated over a shorter term by an IIR at 130, resulting in a short-term integrated power spectrum. A difference, referred to as a delta integrated power spectrum, between the long-term accumulation and the short-term accumulation is calculated at 132.

A sum of a series of delta integrated power spectrums is accumulated at 134 and divided by the number of delta integrated power spectrums included in the sum to find an average delta integrated power spectrum. Alternately, the average delta integrated power spectrum may be a normalized power level experienced in a plurality of delta integrated power spectrums. That average delta integrated power spectrum is used as a standard against which peak delta integrated power spectrums will be compared at 144 to determine their significance.

Simultaneously, if desired, the delta integrated power spectrums having the highest associated power values may be stored in a priority queue at 136. The delta integrated power spectrums in the priority queue are then sorted by frequency at 138. Adjacent delta integrated power spectrums are identified and combined as described herein at 140. The most powerful delta integrated power spectrum is then identified at 142.

At 144, the most powerful delta integrated power spectrum value is compared to the average delta integrated power spectrum from 134. If the most powerful delta integrated power spectrum value is greater than the average delta integrated power spectrum by an amount in excess of an amplitude significance threshold, then that most powerful delta integrated power spectrum has passed an amplitude significance test.

If the most powerful delta integrated power spectrum has passed the amplitude significance test of 144, then that most powerful delta integrated power spectrum is put to a time interval significance test. If the power of the most powerful delta integrated power spectrum was greater than the amplitude significance threshold for more than a minimum duration, which may be established by setting a predetermined time threshold, then the most powerful delta integrated power spectrum passes the time interval significance test at 146.

At 148, the sampling rate of the AFE hardware at 102 is determined and at 149, one or more of the most powerful delta integrated power spectrums are compared to standards to determine to which standard they most closely correspond. That determination may utilize the power and frequency of the most powerful delta integrated power spectrums, and the sampling rate at which samples included in the delta integrated power spectrums may be used in making that comparison. The sampling rate may be used to calculate the actual frequency of the delta integrated power spectrums for common comparison with the standards.

Figure 3:
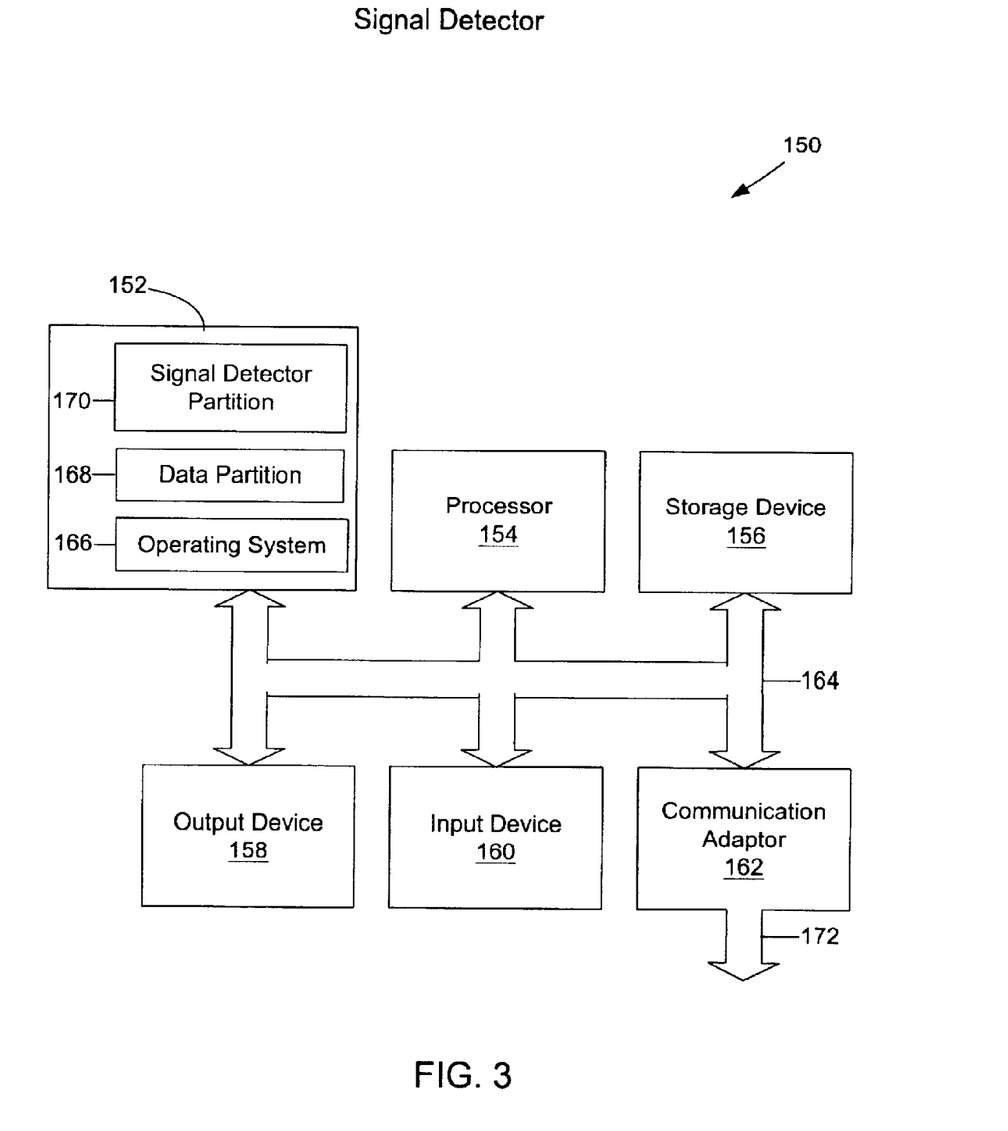
FIG. 3 illustrates an embodiment of a device suitable for detecting a signal.

FIG. 3 illustrates an embodiment of a signal detector 150. The signal detector 150 includes memory 152, a processor 154, a storage device 156, an output device 158, an input device 160, and a communication adaptor 162. It should be recognized that any or all of the components 152–162 of the signal detector 150 may be implemented in a single machine. For example, the memory 152 and processor 154 might be combined in a state machine or other hardware based logic machine.

It should be recognized that the signal detector 150 may have fewer components or more components than shown in FIG. 3. For example, if output devices 158 or input devices 160 are not desired, they may not be included with the signal detector 150.

The memory 152 may, for example, include random access memory (RAM), dynamic RAM, and/or read only memory (ROM) (e.g., programmable ROM, erasable programmable ROM, or electronically erasable programmable ROM) and may store computer program instructions and information. The memory 152 may furthermore be partitioned into sections including an operating system partition 166, wherein instructions may be stored, a data partition 168 in which data may be stored, and a signal detector partition 170 in which instructions for identifying a standard utilized in connection with a signal and stored information related to such identification may be stored. The signal detector partition 170 may also allow execution by the processor 154 of the instructions stored in the signal detector partition 170. The data partition 118 may furthermore store data to be used during the execution of the program instructions such as, for example, information related to standards to which the identifying information is to be compared.

The processor 154 may execute the program instructions and process the data stored in the memory 152. In one embodiment, the instructions are stored in memory 152 in a compressed and/or encrypted format. As used herein the phrase, "executed by a processor" is intended to encompass instructions stored in a compressed and/or encrypted format, as well as instructions that may be compiled or installed by an installer before being executed by the processor 154.

The storage device 156 may, for example, be a magnetic disk (e.g., floppy disk and hard drive), optical disk (e.g., CD-ROM) or any other device or signal that can store digital information. The communication adaptor 162 may permit communication between the signal detector 150 and other devices or nodes coupled to the communication adaptor 162 at a communication adaptor port 172. The communication adaptor 162 may be a network interface that transfers information from nodes 202–208 on a network such as the network 200 illustrated in FIG. 4, to the signal detector 150 or from the signal detector 150 to nodes 202–208 on the network 200. The network in which the signal detector 150 operates may alternately be a Local Area Network (LAN), Wide Area Network (WAN), or the Internet. It will be recognized that the signal detector 150 may alternately or in addition be coupled directly to one or more other devices through one or more input/output adaptors (not shown).

The signal detector 150 may also be coupled to one or more output devices 158 such as, for example, a monitor or printer, and one or more input devices 160 such as, for example, a keyboard or mouse. It will be recognized, however, that the signal detector 150 does not necessarily need to have any or all of those output devices 158 or input devices 160 to operate.

The elements 152, 154, 156, 158, 160, and 162 of the signal detector 150 may communicate by way of one or more communication busses 164. Those busses 164 may include, for example, a system bus, a peripheral component interface bus, and an industry standard architecture bus.

The network in which signal detection is implemented may be a network of nodes such as telephones, computers, or other, typically processor-based, devices interconnected by one or more forms of communication media. The communication media coupling those devices may include, for example, twisted pair, co-axial cable, optical fibers and wireless communication methods such as use of radio frequencies. Network nodes may furthermore be equipped with the appropriate hardware, software or firmware necessary to communicate information in accordance with one or more standards.

Figure 4:
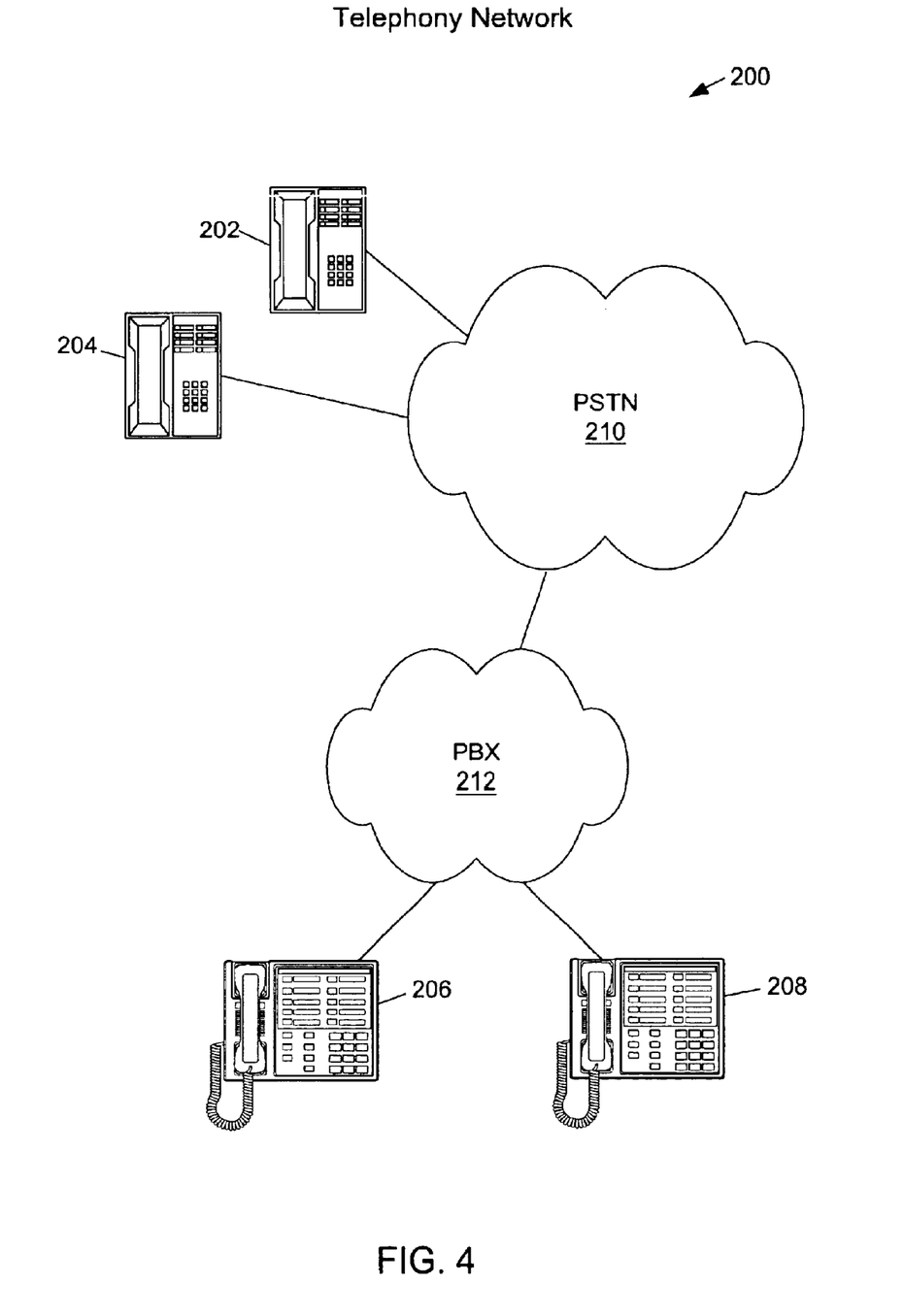
FIG. 4 is a block diagram of an embodiment of a telephony network in which a signal may be detected.

FIG. 4 illustrates an embodiment of a telephony network 200 in which two telephony devices 202 and 204 are coupled to a PSTN 210 and two additional telephony devices 206 and 208 are coupled to a private branch exchange (PBX) 112 that is coupled to the PSTN 210 to form a telephony network 200.

The PBX 212 is a telephone system, typically within an enterprise, that switches calls between telephony devices coupled to the PBX 212 and phone lines coupled to the PSTN 210. A typical PBX includes several interface circuits that are coupled to telephony devices and several interface circuits that are coupled to a PSTN. A switching portion of the PBX 212 makes connections between the telephony devices 206 and 208 coupled to the PBX 212 and other telephony devices 202–208 coupled to the PBX 212 or the PSTN 210.

The PSTN 210 may be a collection of telephony networks operated, for the most part, by telephone companies and administrative organizations. Signal detection may be performed in connection either with telephony devices 202 and 204 coupled directly to a PSTN 210 or telephony devices 206 and 208 coupled to a PBX 212.

Signal detection may be incorporated into a telephony device or may be coupled to a signal transmitting to a telephony device coupled to a PBX 212 or PSTN 210. A signal detection device may thus take the form, for example, of a node, such as a general purpose computer or application specific circuit that couples to a signal being transmitted to or from another telephony device, or a telephony device such as a wireless or cordless telephone, two-way radio, or other telephone. A cordless telephone may include a telephone handset that communicates with a remote base station coupled to a PBX 212 or PSTN 210, for example, by way of signals carried by radio waves. Such cordless telephones may include a radio-frequency transceiver and an omnidirectional antenna to couple to the radio-frequency transceiver.

While the systems, apparatuses, and methods of signal detection have been described in detail and with reference to specific embodiments thereof, it will be apparent to one skilled in the art that various changes and modifications can be made therein without departing from the spirit and scope thereof. Thus, it is intended that the modifications and variations be covered provided they come within the scope of the appended claims and their equivalents.

What is claimed is:

1. A signal detection method, comprising:
   determining power of a frequency component of a signal;
   accumulating the power for a long-term;
   accumulating the power for a short-term;
   finding a delta integrated power spectrum that is a difference between the accumulated power for the long-term and the accumulated power for the short-term;
   finding a high delta integrated power spectrum and a normalized delta integrated power spectrum; and
   determining whether the high delta integrated power spectrum represents a signal of interest by comparing the power of the high delta integrated power spectrum to the power of the normalized delta integrated power spectrum.

2. The method of claim 1, wherein accumulating power includes integrating the power.

3. The method of claim 1 wherein accumulating power is performed by an infinite impulse response filter.

4. The method of claim 1 wherein a long-term is approximately 400 milliseconds.

5. The method of claim 1, wherein a short-term is approximately 200 milliseconds.

6. The method of claim 1, wherein the high delta integrated power spectrum is the delta integrated power spectrum having the highest power of a series of delta integrated power spectrums.

7. The method of claim 1, wherein the high delta integrated power spectrum is one of a plurality of delta integrated power spectrums having the highest power of a series of delta integrated power spectrums.

8. The method of claim 1, wherein the normalized delta integrated power spectrum is an average power experienced in a plurality of delta integrated power spectrums.

9. The method of claim 1, wherein determining whether the high delta integrated power spectrum represents a signal of interest includes:
   finding a power difference by subtracting the power of the normalized delta integrated power spectrum from the power of the high delta integrated power spectrum; and
   determining that the high delta integrated power spectrum represents a signal of interest if the power difference exceeds a predetermined significance threshold.

10. The method of claim 9, wherein determining whether the high delta integrated power spectrum represents a signal of interest further includes determining that the high delta integrated power spectrum represents a signal of interest if the power exceeds the significance threshold for at least a predetermined duration.

11. The method of claim 1, further comprising comparing the high delta integrated power spectrum to a plurality of standards to determine to which standard the high delta integrated power spectrum most closely corresponds.

12. The method of claim 11, wherein multiple high delta integrated power spectrums are utilized in conjunction with a sampling rate at which those high delta integrated power spectrums were taken are used in the comparison.

13. A signal detection device, comprising:
   a processor to determine imaginary and real portions of a signal and determine a frequency component of the signal; a first filter to accumulate power of the frequency component for a long-term;
   a second filter to accumulate power of the frequency component for a short-term;
   a first differentiator to calculate a delta integrated power spectrum that is a difference between the accumulated power for the long-term and the accumulated power for the short-term;
   a filter to determine a normalized power for a plurality of delta integrated power spectrums;
   a memory to store a power value for a highest delta integrated power spectrum; and
   a second differentiator to determining whether the power value for the high delta integrated power spectrum exceeds the normalized power for the plurality of delta integrated power spectrums by at least a predetermined threshold.

14. The device of claim 13, wherein the imaginary and real portions of the signal are determined by utilizing a discrete Fourier transform.

15. The device of claim 14, wherein determining the frequency component includes performing the Pythagorean Theorem on the imaginary and real portions of the signal.

16. The device of claim 13, wherein the first filter and the second filter are infinite impulse response filters.

17. The device of claim 13, wherein the memory includes a queue that includes a plurality of the highest delta integrated power spectrums.

18. The device of claim 13, wherein the plurality of delta integrated power spectrums normalized are a series of delta integrated power spectrums.

19. An article of manufacture, comprising;
   a computer readable medium having stored thereon instructions which, when executed by a processor, cause the processor to:
   determine power of a frequency component of a signal;

accumulate the power for a long-term;

accumulate the power for a short-term;

find a delta integrated power spectrum that is a difference between the accumulated power for the long-term and the accumulated power for the short-term;

select a high delta integrated power spectrum;

calculate a normalized delta integrated power spectrum; and determine whether the high delta integrated power spectrum represents a signal of interest by comparing the power of the high delta integrated power spectrum to the power of the normalized delta integrated power spectrum.

20. The article of claim 19, wherein the high delta integrated power spectrum is one of a plurality of delta integrated power spectrums having the highest power of a series of delta integrated power spectrums.

21. The article of claim 19, wherein the computer readable medium further causes the processor to determine whether the high delta integrated power spectrum represents a signal of interest by:

finding a power difference by subtracting the power of the normalized delta integrated power spectrum from the power of the high delta integrated power spectrum; and determining that the high delta integrated power spectrum represents a signal of interest if the power difference exceeds a predetermined significance threshold.

22. The article of claim 19, wherein the computer readable medium further causes the processor to compare the high delta integrated power spectrum to a plurality of standards to determine to which standard the high delta integrated power spectrum most closely corresponds.

23. A device comprising:

an analog front end clock having an input to be coupled to an analog signal and an output;

a sampler having an input coupled to the analog front end clock and an output coupled to a demodulator;

a processor coupled to the output of the sampler to determine imaginary and real portions of a second signal present at the output of the sampler and determine a frequency component of the second signal;

a first filter to accumulate power of the frequency component for a long-term;

a second filter to accumulate power of the frequency component for a short-term;

a first differentiator to calculate a delta integrated power spectrum that is a difference between the accumulated power for the long-term and the accumulated power for the short-term;

a filter to determine a normalized power for a plurality of delta integrated power spectrums;

a memory to store a power value for a highest delta integrated power spectrum; and a second differentiator to determining whether the power value for the high delta integrated power spectrum exceeds the normalized power for the plurality of delta integrated power spectrums by at least a predetermined threshold.

24. The device of claim 23, wherein the imaginary and real portions of the signal are determined by utilizing a discrete Fourier transform.

25. The device of claim 24, wherein the frequency component is determined by performing the Pythagorean theorem on the imaginary and real portions of the signal.

26. The device of claim 23, wherein the memory includes a queue that includes a plurality of the highest delta integrated power spectrums.

27. A modem, comprising:

a demodulator to couple to an incoming signal;

a processor to determine imaginary and real portions of a signal and determine a frequency component of the signal;

a first filter to accumulate power of the frequency component for a long-term;

a second filter to accumulate power of the frequency component for a short-term;

a first differentiator to calculate a delta integrated power spectrum that is a difference between the accumulated power for the long-term and the accumulated power for the short-term;

a filter to determine a normalized power for a plurality of delta integrated power spectrums;

a memory to store a power value for a highest delta integrated power spectrum; and a second differentiator to determining whether the power value for the high delta integrated power spectrum exceeds the normalized power for the plurality of delta integrated power spectrums by at least a predetermined threshold.

28. The modem of claim 27, wherein the processor further compares the high delta integrated power spectrum to a plurality of standards to determine to which standard the high delta integrated power spectrum most closely corresponds.

* * * * *